United States Patent [19]

Samaritter et al.

[11] 4,379,856
[45] Apr. 12, 1983

[54] POLYURETHANE FOAM MOLDING WITH ZONES OF DIFFERENT INDENTATION HARDNESS AND A PROCESS FOR ITS PRODUCTION

[75] Inventors: Reinhard Samaritter; Winfried Schoberth; Robert Volland, all of Leverkusen, Fed. Rep. of Germany

[73] Assignee: Bayer Aktiengesellschaft, Leverkusen, Fed. Rep. of Germany

[21] Appl. No.: 339,595

[22] Filed: Jan. 15, 1982

[30] Foreign Application Priority Data

Jan. 23, 1981 [DE] Fed. Rep. of Germany ....... 3102140

[51] Int. Cl.$^3$ .............................................. C08G 18/14
[52] U.S. Cl. ...................................... 521/51; 521/79; 521/159; 521/160; 521/917; 264/45.1; 264/45.5; 264/45.8; 264/46.2; 264/46.3; 296/63
[58] Field of Search ................. 521/51, 159, 160, 917, 521/79; 264/45.1, 45.5, 45.8, 46.2, 46.3; 296/63

[56] References Cited

U.S. PATENT DOCUMENTS 3,182,104  5/1965  Cwik ..................................... 521/51
3,519,708  7/1970  McMichael ........................ 264/45.1
3,534,129  10/1970  Bartel ................................ 264/45.1

FOREIGN PATENT DOCUMENTS 2052907  5/1972  Fed. Rep. of Germany .
2523527  12/1975  Fed. Rep. of Germany .
1255660  12/1971  United Kingdom .

Primary Examiner—Maurice J. Welsh
Attorney, Agent, or Firm—Gene Harsh; Joseph C. Gil; Lyndanne M. Whalen

[57] ABSTRACT

A deformable and durable polyurethane foam molding is made from the reaction product of a polyether polyol component and a polyisocyanate component. The polyether polyol component is a polyether having at least two hydroxyl groups, a molecular weight of from 400 to 10,000 and at least 10 wt. % hydroxyl groups which are primary hydroxyl groups. The polyisocyanate component is a mixture of from 60-90 wt. % 4,4'-diphenyl methane diisocyanate and from 3-30 wt. % 2,4'-diphenyl methane diisocyanate. Such reaction mixture is prepared in each of at least two mixing heads. The index of reaction mixture is different from that in the other mixing head. The mixture is then introduced into associated zones of a mold cavity where the mixture is allowed to foam. The molding is subsequently removed from the mold cavity. These polyurethane foam moldings are particularly useful in making seat cushions.

11 Claims, 4 Drawing Figures

POLYURETHANE FOAM MOLDING WITH ZONES OF DIFFERENT INDENTATION HARDNESS AND A PROCESS FOR ITS PRODUCTION

BACKGROUND OF THE INVENTION

This invention relates to a molding made up of a polyurethane foam molding having zones of different hardness and to a process for its production. This molding is particularly useful as a cushion for vehicle seats.

German Offenlegungsschrift No. 20 52 907 discloses a process for producing molded cushioning having areas differing in hardness in a single mold by using foams of different composition. The known processes were disadvantageous in that uncontrollable mixing resulted in flow of foamable reaction mixtures into and/or over one another. Such flow which results in hardening and waviness, made it impossible to achieve a reproducible distribution of hardness. German Offenlegungsschrift No. 20 52 907 resolved this difficulty by delimiting the individual zones from one another by means of textile fabrics or the like in the cavity of the mold, so that when the different reaction mixtures were introduced into the individual zones they were prevented from flowing into and/or over one another. The disadvantage of cushioning produced in this way is that the amount of material required for the inserts and the amount of time required for fixing the inserts in the mold cavity are both considerable and add to the cost of the moldings. Additionally, despite firm adhesion of the foam, these inserts which act as separating surfaces may form weak points along which the foam can split or tear. Such weak points will develop for example, when the cushioning is subjected to severe permanent stressing of the type to which motor vehicle, aircraft and ship seats are subjected.

SUMMARY OF THE INVENTION

It is an object of the present invention to provide a polyurethane molding which is deformable and durable under severe stress.

It is also an object of the present invention to provide a polyurethane molding that is deformable and durable under severe stress and which may be produced rapidly.

It is a further object of the present invention to provide a process for the production of a polyurethane molding which is deformable and durable under severe stress.

It is another object of the present invention to provide a rapid process for the production of a polyurethane molding which is deformable and durable under severe stress.

These and other objects which will be apparent to those skilled in the art are accomplished with a polyurethane foam molding made from the reaction product of a polyether polyol component and a polyisocyanate component. The polyether polyol component is a polyether having at least two hydroxyl groups, a molecular weight of from 400 to 10,000, and at least 10 wt. % hydroxyl groups which are primary hydroxyl groups. The polyisocyanate component is a mixture of from 60–90 wt. % 4,4'-diphenyl methane diisocyanate and from 3 to 30 wt. % 2,4'-diphenyl methane diisocyanate. This reaction mixture is introduced into associated zones of a mold cavity by means of at least two mixing zones (in which the reaction mixtures are of different indices) where the mixture is permitted to foam. The mold is subsequently removed.

DETAILED DESCRIPTION OF THE INVENTION

Figure 1:
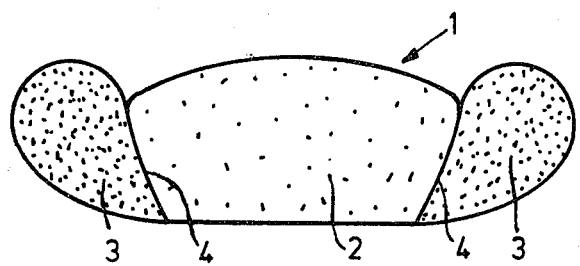
FIGS. 1 and 2 show polyurethane moldings in the form of car seats.

The polyurethane foam molding of the present invention is a reaction product of a polyol component of polyethers containing at least 2 hydroxyl groups and having a molecular weight in the range from 400 to 10,000 in which at least 10% by weight of the hydroxyl groups present are primary hydroxyl groups and a polyisocyanate component containing a mixture of diphenyl methane diisocyanates and oligomeric polyphenyl polymethylene polyisocyanates. This mixture of polyisocyanates contains from 60 to 90 wt. % (preferably from 65 to 80 wt. %) of 4,4'-diphenyl methane diisocyanate and from 3 to 30 wt. % (preferably from 10 to 30 wt. %) of 2,4'-diphenyl methane diisocyanate. The reaction mixture associated with this reaction product has different indices (defined hereinafter) for the individual zones, which indices are characteristic of the required hardness of said zones of the molding and the transitions between the individual zones are free from any hardening.

Cushions of this type are generally used as seat cushions and backrest cushions, but may also be used as arm rests, side rests and the like. Such cushions are characterized by their difference in properties with respect to both the individual zones and the overall effects resulting from the firm bond at the interfaces.

The hardness, i.e. the elastic deformability, of foams may be determined by techniques known to those in the art. Indentation hardness is normally tested in accordance with DIN 53 576 or ASTM 1564 using foam samples having a surface skin. Compression hardness is tested in accordance with DIN 53 577 using foam samples without any surface skin. Manufacturers and consumers, particularly the motor vehicle industry, prefer one or other of these test methods. However, these test methods are inadequate because complete conclusions as to the overall behavior of the cushioning can not be drawn from the results. Tests to determine the behavior of the cushioning as a whole under practical conditions have not, however, been developed.

According to Kunststoff-Handbuch, Vol. VII, Polyurethane, published by Carl Hanser-Verlag, Munich, 1966, page 441, the "index" is defined as follows:

$$\text{index} = \frac{\text{amount of isocyanate (actual)}}{\text{amount of isocyanate (theoretical)}} \times 100$$

The mixture of diphenyl methane diisocyanates and oligomeric polyphenyl polymethylene polyisocyanates used in accordance with the invention and its production are known to those in the art. Among the starting components which may be used in the present invention are aliphatic, cycloaliphatic and aromatic and heterocyclic polyisocyanates of the type described by W. Siefken and Justus Liebigs Annalen der Chemie 562, pages 75 to 136. Specific examples of such polyisocyanates are ethylene diisocyanate; 1,4-tetramethylene diisocyanate; 1,6-hexamethylene diisocyanate; 1,12- dodecane diisocyanate; cyclobutane-1,3-diisocyanate; 1,3- and 1,4-cyclohexane diisocyanate and mixtures of these isomers; 1-isocyanato-3,3,5-trimethyl-5-isocyanatomethyl cyclohexane (German Auslegeschrift No. 1,202,785, U.S. Pat. No. 3,401,190); 2,4- and 2,6-hexahydrotolylene diisocyanate and mixtures of these isomers; 1,3- and/or 1,4-hexahydro phenylene diisocyanate; 2,4'- and/or -4,4'-perhydrodiphenyl methane diisocyanate; 1,3- and 1,4-phenylene diisocyanate; 2,4- and 2,6-tolylene diisocyanate and mixtures of these isomers; naphthylene -1,5-diisocyanate; triphenyl methane-4,4'-4''-triisocyanate; m- and p-isocyanato-phenyl sulfonyl isocyanate (U.S. Pat. No. 3,454,606); perchlorinated aryl polyisocyanates of the type described for example in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162); diisocyanates of the type described in U.S. Pat. No. 3,492,330; polyisocyanates containing allophonate groups of the type described in British Pat. No. 994,890, Belgian Pat. No. 761,626 and in published Dutch patent application No. 7,102,524; polyisocyanates containing isocyanurate groups of the type described in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups of the type described in Belgian Pat. No. 752,261 or in U.S. Pat. No. 3,394,164; polyisocyanates containing acylated urea groups according to German Pat. No. 1,230,778; polyisocyanates containing biuret groups of the type described in German Pat. No. 1,101,394 (U.S. Pat. Nos. 3,124,605 and 3,201,372) and in British Pat. No. 889,050; polyisocyanates produced by telomerization reactions of the type described in U.S. Pat. No. 3,654,106; polyisocyanates containing ester groups of the type described in British Pat. Nos. 965,474 and 1,072,956, U.S. Pat. No. 3,567,763 and German Pat. No. 1,231,688; reaction products of the above-mentioned isocyanates with acetals according to German Pat. No. 1,072,385; and polyisocyanates containing polymeric fatty acid residues according to U.S. Pat. No. 3,455,883.

It is also possible to use the isocyanate-group-containing distillation residues obtained in the commercial production of isocyanates, optionally in solution in one or more of the above-mentioned polyisocyanates. It is also possible to use any mixtures of the above-mentioned polyisocyanates. Monofunctional isocyanates, such as propyl isocyanate, cyclohexyl isocyanate, phenyl isocyanate, tolyl isocyanate, p-chlorophenyl isocyanate may also be used.

Other starting components which may be used in the present invention are polyethers containing at least 2 hydroxyl groups and having a molecular weight of generally from 400 to 10,000. Polyethers containing from 2 to 8 hydroxyl groups are preferred with those having from 2 to 4 hydroxyl groups being most preferred. Polyethers having a molecular weight in the range from 800 to 10,000 are preferred and those in the range from 1000 to 6000 are most preferred. At least 10 wt. % of the hydroxyl groups present in the polyethers should be primary hydroxyl groups.

These polyethers are known to those in the art. Such polyethers may be obtained by polymerizing epoxides (such as ethylene oxide and optionally propylene oxide, butylene oxide, tetrahydrofuran, styrene oxide or epichlorohydrin) on their own in the presence of $BF_3$. Suitable polyethers may also be prepared by the addition of epoxides such as those described above, (in admixture or successively) with starter components containing reactive hydrogen atoms, such as water, alcohols, ammonia or amines. Examples of such reactive-hydrogen containing components are ethylene glycol, 1,3- or 1,2-propylene glycol, trimethylol propane, glycerol, 4,4'-dihydroxy diphenyl propane, aniline, ethanolamine and ethylene diamine. The (terminal) primary hydroxyl groups are preferably formed by the reaction of ethylene oxide. Sucrose polyethers, of the type described in German Auslegeschrift Nos. 1,176,358 and 1,064,938, may also be used in accordance with the invention. Polyethers modified by vinyl polymers, of the type formed by polymerizing styrene and acrylonitrile in the presence of polyethers (U.S. Pat. Nos. 3,383,351; 3,304,273; 3,523,093 and 3,110,695; German Pat. No. 1,152,536) are also suitable, as are polybutadienes containing OH-groups.

In accordance with the present invention, other optional starting components may be used in addition to the polyethers in quantities of up to at most 50 wt. % (based on polyether). Such optional starting materials include: polyesters containing at least 2, generally from 2 to 8 but preferably from 2 to 4 hydroxyl groups, polyethers, polythioethers, polyacetals, polycarbonates and polyester amides free from primary hydroxyl groups. Appropriate materials are those known to be useful in the production of cellular and non-cellular polyurethanes. Such optional materials should have a molecular weight of from 400 to 10,000, preferably from 800 to 10,000 and most preferably from 1000 to 6000.

The polyesters containing hydroxyl groups which may be used in the present invention include the reaction products of polyhydric (preferably dihydric and, optionally, trihydric) alcohols with polybasic (preferably dibasic) carboxylic acids. Instead of using free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example, by halogen atoms, and/or unsaturated.

Examples of suitable carboxylic acids and acid anhydrides are succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids (such as oleic acid) optionally in admixture with monomeric fatty acids; terephthalic acid dimethyl ester and terephthalic acid-bis-glycol ester. Examples of suitable polyhydric alcohols are ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylol propane, 1,2,6-hexane triol, 1,2,4-butane triol, trimethylol ethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol and polybutylene glycols. Polyesters of lactones, for example, α-caprolactone, or hydroxy carboxylic acids, for example ω-hydroxy caproic acid, may also be used.

The polyethers containing at least 2, generally 2 to 8 and preferably 2 to 3 hydroxyl groups (but no primary hydroxyl groups) which may optionally be used in the present invention are also known to those in the art. Such polyethers may be obtained by polymerizing epoxides such as ethylene oxide, propylene oxide, butylene oxide, tetrahydrofuran, styrene oxide or epichlorohydrin. Polymerization may be carried out with only the epoxides themselves in the presence of $BF_3$, or by the addition of these epoxides, (optionally in admixture or successively) with starter components containing reactive hydrogen atoms. Such reactive hydrogen-containing components include water, alcohols, ammonia and amines. Specific examples of such components are ethylene glycol, 1,3- and 1,2-propylene glycol, trimethylol propane, 4,4'-dihydroxy diphenyl propane, aniline, ethanolamine and ethylene diamine. Sucrose polyethers, of the type described for example in German Auslegeschrift Nos. 1,176,358 and 1,064,938, may also be used in the present invention. None of these polyethers contains any primary OH-groups.

Among the polythioethers which may be used in the present invention, the condensation products of thiodiglycol itself and/or with other glycols, dicarboxylic acids, formaldehyde, aminocarboxylic acids or amino alcohols are particularly advantageous. Depending upon the specific co-components, the products of such condensation may be polythio mixed ethers, polythioether esters or polythioether ester amides.

Suitable polyacetals for the practice of the present invention include the compounds obtainable from glycols such as diethylene glycol, triethylene glycol, 4,4'-dioxethoxy diphenyl methyl methane, hexane diol and formaldehyde. Polyacetals obtained by polymerizing cyclic acetals may also be used.

Suitable polycarbonates containing hydroxyl groups are known to those in the art. Appropriate polycarbonates may be obtained by reacting diols (such as 1,3-propane diol, 1,4-butane diol and/or 1,6-hexane diol, diethylene glycol, triethylene glycol or tetraethylene glycol) with diaryl carbonates (for example diphenyl carbonate or phosgene).

The polyester amides and polyamides which may be used in the present invention include the predominantly linear condensates obtained from polybasic saturated and unsaturated carboxylic acids or their anhydrides, polyhydric saturated and unsaturated amino alcohols, diamines, polyamines and mixtures thereof.

Polyhydroxyl compounds in which urethane or urea groups are initially present and modified natural polyols (such as castor oil, carbohydrates or starch) may also be used in the present invention. Addition products of alkylene oxides with phenol-formaldehyde resins or even with urea-formaldehyde resins may also be used in accordance with the invention.

Representatives of the above-mentioned compounds suitable for use in the present invention are described in High Polymers, Vol. XVI, "Polyurethanes, Chemistry and Technology", by Saunders-Frisch, Interscience Publishers, New York, London, Vol. I, 1962, pages 44 to 54 and Vol. II, 1964, pages 5 to 6 and 198 to 199, and in Kunststoff-Handbuch, Vol. VII, Vieweg-Hochtlen, Carl-Hanser-Verlag, Munich, 1966, for example on pages 45 to 71.

It is of course possible to use mixtures of the above-mentioned compounds containing at least 2 isocyanate-reactive hydrogen atoms and having a molecular weight in the range from 400 to 10,000, (e.g., mixtures of polyethers and polyesters).

Other starting components which may optionally be used in the present invention in quantities of up to 50 wt. % (based on the polyether) are compounds containing at least 2 isocyanate-reactive hydrogen atoms and having a molecular weight in the range from 32 to 400. Such compounds are compounds containing hydroxyl groups and/or amino groups and/or thiol groups and/or carboxyl groups, preferably hydroxyl groups and/or amino groups. These compounds act as chain-extending agents or crosslinking agents and generally contain from 2 to 8 (preferably 2 or 3) isocyanate-reactive hydrogen atoms. Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, trimethylol ethane, pentaerythritol, quinitol, mannitol and sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxy diphenyl propane, dihydroxy ethyl hydroquinone, ethanolamine, diethanolamine, triethanolamine, 3-aminopropanol, ethylene diamine, 1,3-diaminopropane, 1-mercapto-3-amino propane, 4-hydroxy- or aminophthalic acid, succinic acid, adipic acid, hydrazine, N,N'-dimethyl hydrazine, 4,4'-diaminophenyl methane, tolylene diamine, methylene-bis-chloroaniline, methylene-bis-anthranilic acid ester, diaminobenzoic acid ester and the isomeric chlorophenylene diamines. It is also possible to use hydroxyalkyl amines containing terminal secondary and/or primary amino groups in the present invention. The following compounds are typical: N-methylaminoethanol, N-methylaminopropanol, hydroxyalkyl piperazines (such as hydroxyethyl piperazine), 2-(methyl-(3-aminopropyl)-amino)-ethanol, 2-amino-2-methyl propanol, 4-hydroxybutyl-3-aminopropyl ether.

It is also possible to use quantities of up to 50 wt. % (based on the polyether) of polyhydroxyl compounds containing high molecular weight polyadducts or polycondensates in finely dispersed or dissolved form. Modified polyhydroxyl compounds of this type are obtained directly by polyaddition reactions (e.g., reactions between polyisocyanates and amino functional compounds) or polycondensation reactions (e.g., reactions between formaldehyde and phenols and/or amines) in situ in the above-mentioned compounds containing hydroxyl groups. Processes such as these are described in German Auslegeschrifts Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. It is also possible to mix an aqueous polymer dispersion with a polyhydroxyl compound and subsequently to remove the water from the mixture. (See e.g., U.S. Pat. No. 3,869,413 or German Offenlegungsschrift No. 2,550,860.)

According to the invention, water and/or readily volatile organic substances may be used as blowing agents. Suitable organic blowing agents include acetone; ethyl acetate, halogen-substituted alkanes, such as methylene chloride, chloroform, ethylidene chloride, vinylidene chloride, monofluorotrichloromethane, chlorodifluoromethane, dichlorodifluoromethane and butane, hexane, heptane and diethyl ether. A blowing effect may also be obtained by adding compounds which decompose at temperatures above room temperature and give off gases such as nitrogen (e.g., azoisobutyronitrile). Other examples of blowing agents and information on the use of blowing agents may be found in Kunststoff-Handbuch, Vol. VII, by Vieweg and Hochtlen, Carl-Hanser-Verlag, Munich, 1966, at pages 108 and 109, 453 to 455 and 507 to 510.

In accordance with the present invention, catalysts may also be used. Suitable catalysts are known to those in the art. Appropriate catalysts are tertiary amines, such as triethyl amine, tributyl amine, N-methyl morpholine, N-ethyl morpholine, N,N,N',N'-tetramethyl ethylene diamine, 1,4-diazabicyclo-(2,2,2)-octane, N-methyl-N'-dimethylaminoethyl piperazine, N,N-dimethyl benzylamine, bis-(N,N-diethylaminoethyl)-adipate, N,N-diethylbenzylamine, pentamethyl diethylene triamine, N,N-dimethylcyclohexyl amine, N,N,N',N',-tetramethyl-1,3-butane diamine, permethylated tetraethylene pentamine, tetramethyl hexamethylene diamine, N,N-dimethyl-$\beta$-phenyl ethylamine, 1,2-dimethyl imidazole, 2-methyl imidazole. Other suitable catalysts are Mannich bases of secondary amines (such as dimethylamine), aldehydes, (preferably formaldehyde), ketone (such as acetone, methyl ethyl ketone or cyclohexanone), and phenols (such as phenol, nonyl phenol or bis-phenol). Tertiary amines containing isocyanate-reactive hydrogen atoms suitable for use as catalysts include triethanolamine, triisopropanolamine, N-methyl diethanolamine, N-ethyl diethanolamine, N,N-dimethylethanolamine, and their reaction products with alkylene oxides (such as propylene oxide and/or ethylene oxide).

Other suitable catalysts are sila-amines containing carbon-silicon bonds, of the type described in German Pat. No. 1,229,290 (corresponding to U.S. Pat. No. 3,620,984), such as 2,2,4-trimethyl-2,silamorpholine and 1,3-diethylaminomethyl tetramethyl disiloxane.

Other suitable catalysts are nitrogen-containing bases (such as tetraalkyl ammonium hydroxides), alkali hydroxides (such as sodium hydroxide) alkali phenolates (such as sodium phenolate), and alkali alcoholates (such as sodium methylate). Hexahydrotriazines may also be used as catalysts.

In the present invention, organometallic compounds particularly organotin compounds, may also be used as catalysts.

Preferred organotin compounds are tin (II) salts of carboxylic acids such as tin (II) acetate, tin (II) octoate, tin (II) ethyl hexoate and tin (II) laurate; and tin (IV) compounds such as dibutyl tin oxide, dibutyl tin dichloride, dibutyl tin diacetate, dibutyl tin dilaurate, dibutyl tin maleate and dioctyl tin diacetate.

All the catalysts mentioned above may, of course, be used in the form of mixtures.

Other representative catalysts which may be used in accordance with the present invention and information on the way in which they work may be found in Kunststoff-Handbuch, Vol. VII, by Vieweg and Hochtlen, Carl-Hanser-Verlag, Munich, 1966 pages 96 to 102.

Catalysts should generally be used in a quantity of from about 0.001 to 10 wt. % (based on the quantity of polyethers having a molecular weight of from 400 to 10,000).

In addition, surface-active additives, such as emulsifiers and foam stabilizers, may optionally be used in accordance with the invention. Examples of suitable emulsifiers are the sodium salts of castor oil sulfonates and salts of fatty acids with amines (such as diethylamine oleate or diethanolamine stearate). Alkali or ammonium salts of sulfonic acids (such as dodecyl benzene sulfonic acid or dinaphthyl methane disulfonic acid) or of fatty acids (such as ricinoleic acid), or of polymeric fatty acids may also be used as surface-active additives.

Suitable foam stabilizers are polyether siloxanes, particularly water-soluble types. The structure of these compounds is generally such that a copolymer of ethylene oxide and propylene oxide is attached to a polydimethyl siloxane residue. Foam stabilizers of this type are described in U.S. Pat. Nos. 2,834,748, 2,917,480 and 3,629,308. It is, however, possible to carry out the present invention without using foam stabilizers of the polyether siloxane type.

In the practice of the present invention, it is also possible to use reaction retarders (e.g., acid-reacting substances such as hydrochloric acid or organic acid halides), known cell regulators (such as paraffins, fatty alcohols or dimethyl polysiloxanes), pigments or dyes, known flameproofing agents (e.g., tris-chloroethyl phosphate tricresyl phosphate or ammonium phosphate and polyphosphate), stabilizers against the effects of ageing and weather, plasticizers, fungistatic and bacteriostatic substances and fillers (such as barium sulfate, kieselguhr, carbon black and whiting).

Further examples of appropriate surface-active additives and foam stabilizers, cell regulators, reaction retarders, stabilizers, flameproofing agents, plasticizers, dyes, fillers, fungistatic and bacteriostatic substances which may optionally be used in accordance with the present invention and information on the way in which these additives may be used and on their respective modes of action may be found in Kunststoff-Handbuch by Vieweg and Hochtlen, Vol. VII, Carl-Hanser-Verlag, Munich, 1966, on pages 103 to 113.

According to the present invention, the reaction components may be reacted by the known one-shot process, by the prepolymer process or by the semi-prepolymer process in machines having at least two mixers such as that described in U.S. Pat. No. 2,764,565. Particulars of processing machines which may be used in the practice of the present invention may be found in Kunststoff-Handbuch by Vieweg and Hochtlen, Vol. VII, Carl-Hanser-Verlag, Munich, 1966, on pages 121 to 205.

In the present invention, foaming is carried out in molds. The reaction mixture is introduced into a mold by means of at least two mixers. A different index (generally between 80 and 130) is maintained in each mixer during the foaming process. Suitable mold materials are metals (e.g., aluminum), or plastics (e.g., epoxide resin). The foamable reaction mixture foams in the mold and forms the molding. In-mold foaming may be carried out in such a way that the molding has a cellular structure at its surface, or in such a way that the molding has a compact skin and a cellular core. It is possible to introduce foamable reaction mixture into the mold in such a quantity that the foam formed just fills the mold. However, it is also possible to introduce into the mold more foamable reaction mixture than is required for filling the interior of the mold. This latter technique is known as "overpacking" and is described in U.S. Pat. Nos. 3,178,490 and 3,182,104.

Where foaming is carried out in molds, known "external release agents" such as silicone oils, are frequently used. However, it is also possible to use so-called "internal release agents", optionally in admixture with external release agents, of the type described in German Offenlegungsschrift Nos. 2,121,670 and 2,307,589.

In the present invention, cold-hardening foams are obtained (cf. British Pat. No. 1,162,517 and German Offenlegungsschrift No. 2,153,086).

The products of the present invention may be used as cushioning materials.

In addition to the effect which the index (defined above) has upon the composition of the foam in the individual zones, special effects may be obtained by suitably arranging the openings through which the reaction mixture enters the mold cavity. For example, a molding which is a vehicle seat cushion having a stress zone of fairly minimal hardness and a lateral support zone of much greater hardness may have lateral support zones made up of ridges which extend into the stress zone. It is also possible to make the stress zone have ridges which extend into the lateral support zones.

In the context of the present invention, "stress zones" are those zones of a cushion which permanently and directly absorb the body weight of the user, such as the seat zone and the backrest zone. The "lateral support zones" are those zones which are merely stressed as the result of lateral movement of an adjoining surface or in the event of transverse forces acting upon an adjoining surface such as the force generated when a motor vehicle is turned around a corner. In one embodiment of the present invention, the ridges may be in the form of tapering lobe-like extensions and/or in the form of collars.

The ability to regulate the composition of a molding by controlling the index in accordance with the present invention permits the design of cushions for any type of vehicle seat and for any type of cushion which is subjected to frequent stressing to achieve optimum comfort. For example, depending upon the size of the lobe-like extension or collars, it is possible to obtain both an increase in hardness at high deformation levels and an increase in the force required for laterally deflecting the support zones.

The desired configuration of the zone interfaces may be obtained by suitably arranging the inlet openings of the mixing heads, by selecting appropriate filling times and by selecting appropriate quantities of mixture to be introduced into the individual zones.

Several embodiments of polyurethane moldings within the scope of the present invention are shown diagrammatically in cross section in FIGS. 1 through 4.

In FIG. 1, the seat cushion 1 is made up of three zones. The stress zone 2 serves as the sitting zone. The other two zones are the lateral support zones 3. The foam of sitting zone 2 is softer than that of the support zones 3. The interface 4 present between the zones 2 and 3 are substantially flat.

Figure 2:
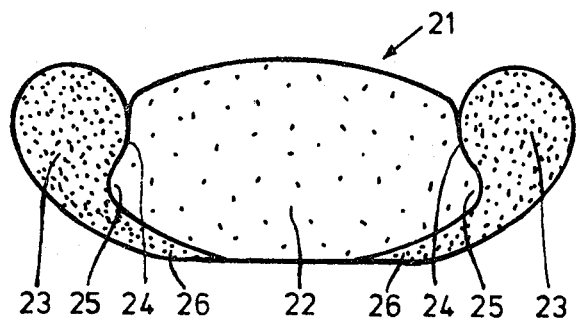

In FIG. 2, the seat cushion 21 is also made up of 3 zones. The stress zone 22 is the sitting zone and the other two zones are the lateral support zones 23. The sitting zone 22 is made of a softer (i.e. more elastically deformable) foam than the lateral support zones 23. By virtue of the particular arrangement of the inlet openings, the choice of the addition times and the quantities of materials added, defined interfaces 24, collars 25 of the sitting zone 22 bulging into the guide zone 23 and the lobe-like extension 26 of the guide zone 23 engaging below the sitting zone 22 are formed between zones 22 and 23 upon introduction of the reaction mixture to the mold.

Figure 3:
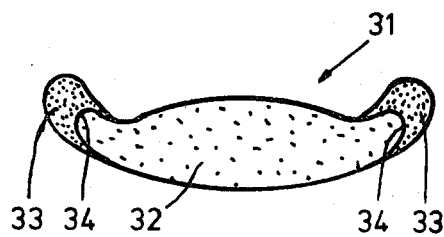
FIGS. 3 and 4 show a molding in the form of backrest cushions.

In FIG. 3, the backrest cushion 31 is made up of three zones, namely the stress zone 32 which serves as the leaning zone and the lateral support zones 33. The leaning zone 32 is made of a softer foam (i.e. a more elastically deformable foam) than the lateral support zones 33. Collars 34 of the zone 32 extend into the lateral support zones 33.

Figure 4:
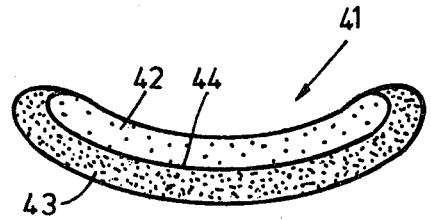

In FIG. 4, the backrest cushion 41 is also made up of a leaning zone 42 and lateral support zones 43. However, the lateral support zones 43 merge into one another at the back of the leaning zone 42, surrounding the leaning zone 42 like a shell. The leaning zone 42 is composed of relatively soft foam.

To produce a molding made of polyurethane foam, particularly a cushion for vehicle seats having zones of different indentation hardness, it is essential that the foamable reaction mixture be introduced by means of several mixing heads into associated zones of the cavity of a mold. The molding is removed from the mold after foaming.

The reaction mixture which should be used in such a process is one which contains a polyol component made up of polyethers containing at least 2 hydroxyl groups and having a molecular weight in the range from 400 to 10,000, in which at least 10 wt. % of the hydroxyl groups are primary hydroxyl groups and a polyisocyanate component which is a mixture of diphenyl methane diisocyanates and oligomeric polyphenyl polymethylene polyisocyanates. This polyisocyanate component should contain from 60 to 90 wt. % (preferably from 65 to 80 wt. %) 4,4'-diphenyl methane diisocyanate and from 3 to 30 wt. % (preferably from 10 to 30 wt. %) 2,4'-diphenyl methane diisocyanate. The reaction mixture should be separately produced in at least two mixing heads so that at least two reaction mixtures having different indices (corresponding to the particular hardness required) may be used. Each mixing head is used to feed the appropriate zone of the mold.

This process ensures that the entire cushion can be made from reaction mixtures formed from the same material but which have different indices for each individual zone. This process simplifies production considerably, improves quality and optimizes the overall properties of the product molding.

In one particular embodiment of the invention, the reaction mixture may be introduced into the various zones in such a way that the streams introduced through various openings flow against and into one another. Reproducible, contoured interfaces in mesh-like engagement with one another are thus formed. This is particularly important in regard to the stability of the cushion. In addition to the firm adhesion of the various foam zones to one another, this mesh-like engagement also makes it possible to affect the overall properties of the cushion in a manner which could not be achieved simply through use of different hardnesses of the individual zones. The particular advantage of this embodiment lies in the hardening-free transition of the foam at the interfaces between adjacent zones.

To produce a seat cushion for a vehicle seat, the inlet openings for the reaction mixture should be arranged in such a way that the sitting zone with its relatively soft foam will be heavily pronounced in the vicinity of the knee joints, while the posterior region of the seat cushion will be virtually surrounded by the lateral support zones at its rear end.

Similar effects in regard to stiffness may also be obtained in backrests of vehicle seats to ensure support adapted to the spine of the human body.

Having thus described our invention, the following Example is given by way of illustration.

EXAMPLES

The following reaction mixture was used to produce the seat cushion 1 (FIG. 1) which had a total weight of 1750 g.

Component A 100 parts by weight of a polyether obtained by the addition of propylene oxide and then ethylene oxide with trimethylol propane and having a functionality of 3 and a primary OH-group-content of approximately 80 wt. % for an OH-number of approximately 30;

3.1 parts by weight of water;

0.2 part by weight of bis-dimethylaminoethyl ether;

0.4 part by weight of a commercial foam stabilizer (Stabilizer KS 43, a product of Bayer AG, Leverkusen, Federal Republic of Germany);

0.8 part by weight of triethylene diamine (33% in dipropylene glycol).

Component B 53.3 parts by weight of an isocyanate (index 100) containing 65 wt. % 4,4'-diphenyl methane diisocyanate and approximately 20 wt. % 2,4'-diphenyl methane diisocyanate and approximately 15 wt. % of polymeric MDI (NCO content of approximately 32.5%).

An index of 85 (i.e. 104.5 parts by weight of component A and 44.5 parts by weight of component B) was chosen for the sitting zone 2. By contrast, an index of 120 (i.e. 62.8 parts by weight of component B to 104.5 parts by weight of component A) was used for the lateral support zones 3. Each mixture was charged to the appropriate zones of the mold cavity. Weight distribution of the quantity of reaction mixture used amounted to 340 g for each of the two lateral support zones 3 and to 1250 g for the sitting zone 2.

The mold was opened after 3.5 to 4 minutes. A visually satisfactory molding was obtained. The molding obtained did not show any deterioration in its tear resistance or tear propagation resistance properties at the interfaces 4 of the zones 2 and 3 (FIG. 1). Visual observation of any such deterioration would have been possible because suitable dyes had been added to each reaction mixture. Several moldings were made in this manner.

Measurement of the indentation hardness in the sitting zone—in accordance with DIN 53 576, method C, 4 deformations by 40% of the height, evaluated at 40% on the fourth occasion (C-test stamp: diameter 202 mm)—produced a value of 265 N.

Determination of the gross density and compression hardness of the foam forming the sitting zone 2 and the lateral support zones 3 gave the following reproducible values:

|  | Sitting zone 2 | Left-hand lateral zone 3 | Right-hand lateral zone 3 |
| --- | --- | --- | --- |
| Gross density according to DIN 53 420 (kg/m$^3$) | 50 | 54 | 55 |
| Compression hardness according to DIN 53 577 (kPa) | 3.3 | 13.1 | 13.2 |

In view of the consistency between the gross densities, the compression hardness values of the left-hand and right-hand lateral support zones 3 and in view of the absence of a standardized method for measuring such effects as lateral supportability or the like, the indentation hardness of the lateral supports was not measured. However, it is reasonable to assume that they would be comparable in view of the compression hardness values determined.

What is claimed is:

1. A polyurethane molding having zones of different hardness in which the polyurethane foam molding is a reaction product of:
    a a polyether polyol component containing at least two hydroxyl groups and having a molecular weight of from 400 to 10,000 in which at least 10 wt. % of the hydroxyl groups are primary hydroxyl groups; and
    b a polyisocyanate component which is a mixture of diphenyl methane diisocyanates and oligomeric polyphenyl polymethylene polyisocyanates which mixture contains from 60–90 wt. % 4,4'-diphenyl methane diisocyanate and from 3 to 30 wt. % 2,4'-diphenyl methane diisocyanate, said reaction product having (i) zones of different hardness as indicated by a difference between the indices of the reaction mixture for those zones and (ii) transition zones between said zones (i) which transition zones are free from any hardening.

2. The molding of claim 1 wherein the polyisocyanate component is a mixture of 65–80 wt. % 4,4'-diphenyl methane diisocyanate and 10–30 wt. % 2,4'-diphenyl methane diisocyanate.

3. The molding of claim 1 which is a cushion for a vehicle seat having a relatively soft stress zone and relatively firm lateral support zones wherein the lateral support zones are made up of ridges extending into the stress zones.

4. The molding of claim 3 wherein the ridges are in the form of tapering lobes.

5. The molding of claim 3 wherein the ridges are in the form of collars.

6. The molding of claim 1 which is a cushion for a vehicle seat having a relatively soft stress zone and relatively firm lateral support zones in which the soft stress zone is made up of ridges extending into the lateral support zones.

7. The molding of claim 6 wherein the ridges are in the form of tapering lobes.

8. The molding of claim 6 wherein the ridges are in the form of collars.

9. A process for the production of a polyurethane foam molding having zones of different hardness comprising:
    a introducing a foamable reaction mixture into associated zones of a mold cavity by means of at least two mixing heads in each of which the reaction mixture has a different index from that of the reaction mixture in the other mixing head;

b allowing the reaction mixture to foam; and
c removing the mold after foaming is substantially complete wherein the foamable reaction mixture is made up of
  (i) a polyether polyol component having at least two hydroxyl groups and a molecular weight of from 400 to 10,000 in which at least 10 wt. % of the hydroxyl groups are primary hydroxyl groups; and
  (ii) a polyisocyanate component which is a mixture comprising from 60-90 wt. % 4,4'-diphenyl methane diisocyanate and from 3-30% wt. % 2,4'-diphenyl methane diisocyanate.

10. The process of claim 9 wherein the reaction mixture is introduced into the zones of the mold in a manner such that streams of the mixture are introduced from the mixing heads flow against and into one another.

11. Polyurethane foam molding, produced by use of the process according to claim 9.

* * * * *